(No Model.)

T. M. BOWERS.
PLOW SLIDE.

No. 437,768. Patented Oct. 7, 1890.

Witnesses
Thos. Houghton.
T. F. Arnold.

Inventor
Thomas M. Bowers,
By D. W. Knight,
his Attorney

UNITED STATES PATENT OFFICE.

THOMAS MARTIN BOWERS, OF DENTON, TEXAS.

PLOW-SLIDE.

SPECIFICATION forming part of Letters Patent No. 437,768, dated October 7, 1890.

Application filed June 6, 1890. Serial No. 354,480. (No model.)

*To all whom it may concern:*

Be it known that I, THOMAS MARTIN BOWERS, a citizen of the United States, residing at Denton, in the county of Denton and State of Texas, have invented certain new and useful Improvements in Plow-Slides; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that sort of useful instruments in which one tool takes the place of several, and is specially adapted to the use of farmers.

It consists, primarily, of a slide or shoe for a plow, to which are added a scraper or paddle, a cutting-tool, and a wrench, as more particularly shown in the accompanying drawings.

Figure 1:
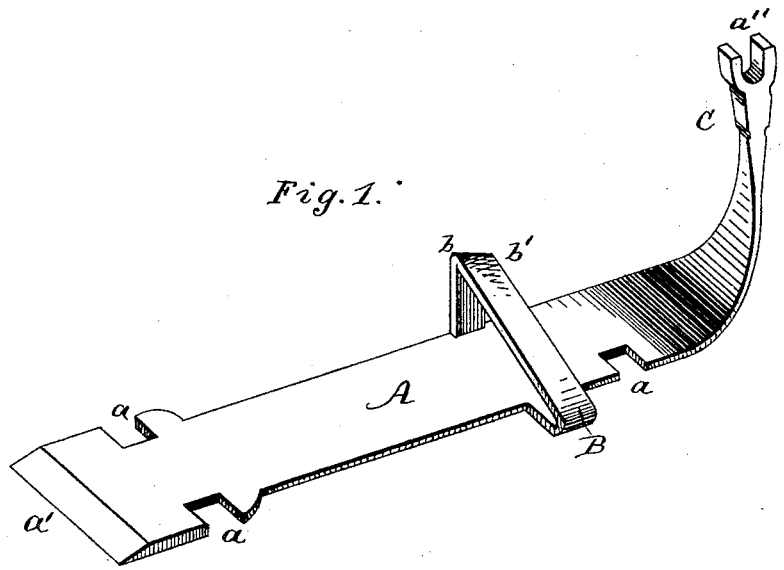
Figure 2:
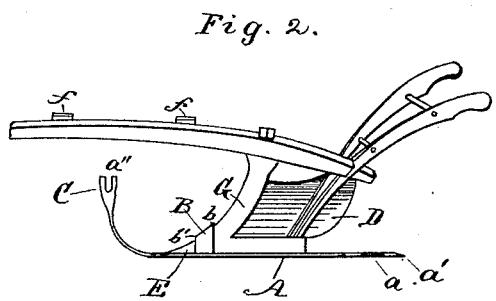

Figure 1 is a perspective view of the device, showing its several features. Fig. 2 is a side elevation of a plow, showing the attachment of the device as a slide.

A represents the device, usually made of wrought or cast iron, ordinarily twelve inches long and two inches wide and of a suitable thickness, tapering at one end C, which may be called the "front end," and bent upward, so as to present the general appearance of a sleigh-runner.

B is an iron strap or loop crossing A at a point near its front end, welded or otherwise suitably fastened thereto, and so constructed that it makes a double angle with the surface of the bar A, being higher at $b$ than at $b'$ and higher at $b$ and $b'$ than at B, the triangular space within it conforming in general to the shape of the point of the plow with which it is designed to be used. In the drawings the strap is supposed to be made for a right-hand plow, and of course its relative dimensions would be reversed with a left-hand plow.

$a'$ is a beveled edge constructed at the rear end of the bar A, and may be made of steel and keenly sharpened.

$a, a,$ and $a$ are openings in the sides of plate A, and $a''$ is an opening in the front end C, of various sizes, adapted to the nuts which are used in the plow.

When used as a slide, the landside of the plow is placed upon A, its point E passing under the strap B, and the plow is thus kept out of the ground when in transit.

When not in use, the device may be hung in a suitable rack at the side or top of the beam of the plow, as at $ff$ in Fig. 2, or on the handle.

The beveled edge $a$ is used as a scraper or paddle for cleaning the plow, and when sharpened as a light cutting-tool.

By means of the openings $a\ a''$ the device is used as a wrench.

As a whole the device is admirably adapted to the convenience of the farmer when plowing, and is simple and cheap in construction.

Having thus fully described my invention, what I claim, and desire to secure Letters Patent for, is—

A combination-tool for use with plows, consisting of a suitable bar having one end turned upward, provided with a beveled edge at the other end, a suitable cross-strap, and having openings at the sides, and bent ends adapted to the nuts used in a plow, substantially as described.

In testimony whereof I affix my signature in presence of two witnesses.

THOMAS MARTIN BOWERS.

Witnesses:
J. D. PARKS,
SAM H. HOSKINS.